United States Patent [19]

Gavrun, III

[11] Patent Number: 4,981,058

[45] Date of Patent: Jan. 1, 1991

[54] PUNCH AND DIE SET AND METHOD ADAPTED TO EFFECT PARTING BETWEEN ADJACENT SECTIONS OF A WORKPIECE

[75] Inventor: Andrew G. Gavrun, III, Lawton, Mich.

[73] Assignee: Lear Siegler, Inc., Kalamazoo, Mich.

[21] Appl. No.: 245,005

[22] Filed: Sep. 14, 1988

[51] Int. Cl.$^5$ ............................................. B26D 1/08
[52] U.S. Cl. .......................................... 83/34; 83/49; 83/636; 83/694; 83/916
[58] Field of Search ................. 83/36, 39, 49, 71, 549, 83/552, 685, 686, 689, 690, 694, 916, 636

[56] References Cited

U.S. PATENT DOCUMENTS

| | | | |
|---|---|---|---|
| 3,489,049 | 1/1970 | Krynytzky et al. | 83/690 |
| 3,877,332 | 4/1975 | Roch | 83/45 X |
| 4,250,784 | 1/1981 | Bredow | 83/552 X |
| 4,393,570 | 7/1983 | Frick et al. | 83/49 X |
| 4,674,373 | 6/1987 | Kuppinger | 83/49 |
| 4,696,211 | 9/1987 | Bitzel | 83/49 |
| 4,738,173 | 4/1988 | Kiuchi | 83/49 X |

Primary Examiner—Hien H. Phan
Attorney, Agent, or Firm—Gordon W. Hueschen

[57] ABSTRACT

An apparatus and a method are disclosed, in which a shear and die set is adapted to be used in a numerically-controlled turret punch press for separating adjacent portions of a workpiece along predetermined parting lines, the shear and die set having a lower shearing or cutting edge on a vertical side of the shear portion of said set which is reciprocated vertically in shearing proximity to an upper cutting or shearing edge of a vertical wall of the die portion of said set, so that only a partial shear is effected for any reciprocation, and advancing the workpiece during the reciprocation so that a stepwise cut is effected along the entire length of said predetermined parting line and separation of the workpiece along said predetermined parting line is obtained.

5 Claims, 3 Drawing Sheets

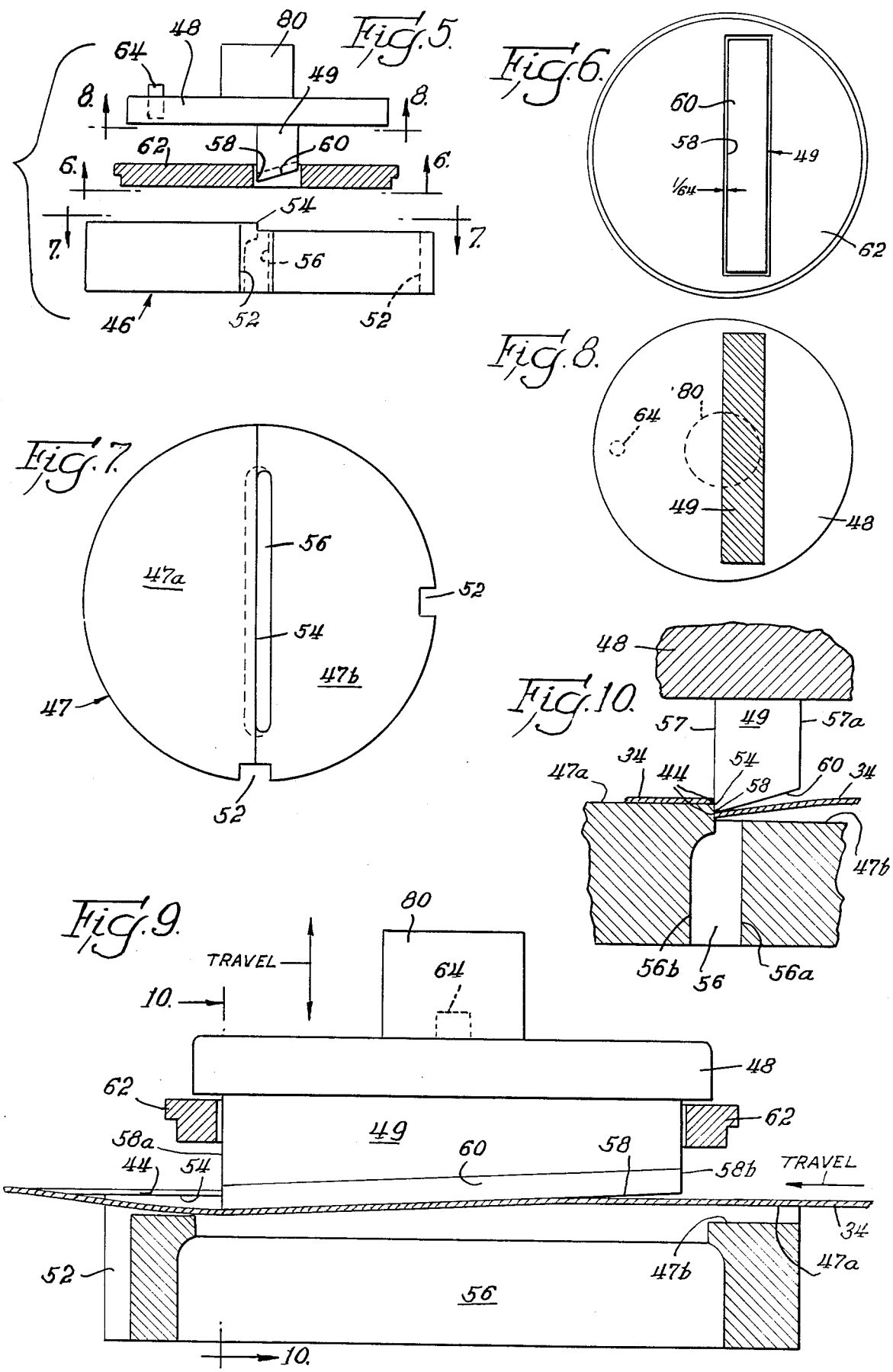

PUNCH AND DIE SET AND METHOD ADAPTED TO EFFECT PARTING BETWEEN ADJACENT SECTIONS OF A WORKPIECE

FIELD OF THE INVENTION AND THE PRIOR ART

This invention relates to a punch and die set adapted to effect parting between adjacent sections of a workpiece and to a method for effecting parting between sections of a workpiece and is particularly directed to such a punch and die set and to a method which are adapted for use in a numerically-controlled turret punch press.

Numerically-controlled turret punch presses are well known in the art. They comprise upper and lower turrets axially disposed one above the other and adapted to hold sets of complementary tools, such as punch and die sets, and to rotate them into effective operating positions. They are computer controlled so that tools and work positions can be selected by punching predetermined number combinations into the computer control.

Examples of such presses are to be found in U.S. Pat. Nos. 4,532,845, 4,738,173, 4,719,830, and 4,703,678. In these and like prior art devices, the punch and die sets punch or intact portions (scrap) out of the workpiece, or else effect a gross shear of portions of the workpiece. In such latter case, a substantial portion of the cut, however, is not sheared off cleanly, but generally breaks off. Thus, on a part of the workpiece the shear is clean and smooth, but on the final portion of the workpiece near the opposite side, i.e., opposite to the side first contacted by the shear, it is not. The force which must be applied by the shear is so great that the last portion generally breaks off leaving a rough or sharp edge all along the parting line opposite to the side thereof first contacted by the shear.

It is an object of the invention to avoid the disadvantages of the prior art and to provide apparatus and method capable of slicing through the workpiece without leaving a rough or sharp edge or leaving a considerable amount of the starting sheet material to tare or scrap.

SUMMARY OF THE INVENTION

The invention relates to a shear and die set adapted to effect parting between adjacent sections of a workpiece consisting essentially of the following elements in combination:

an upper cutting element comprising an elongated cutting blade which is essentially vertical on one side and which has a cutting lower edge at the bottom of said essentially vertical side, said cutting blade being angled upward from said cutting lower edge of said essentially vertical side to a shorter opposite side of said cutting element and upwardly from the near end to the remote end;

said upper cutting element at its cutting edge defining the portion of said punch and die set which is operative to cut off a section of said workpiece and capable of being vertically reciprocated in said punch press;

a lower cutting element comprising a die member having two essentially planar surfaces lying in essentially horizontal parallel planes, one of which is slightly above the other, and a vertical wall depending from the inner edge of the upper planar surface toward the lower planar surface; and said lower cutting element being adapted to be secured to a non-reciprocatable portion of said punch press in a position such that said vertical wall is aligned with said cutting lower edge of said cutting blade so that, upon closing said upper cutting element upon said lower cutting element, said cutting lower edge is aligned in slidable vertical relation with said vertical wall in cutting proximity thereto.

The invention also relates to one or more further features wherein the cutting elements are adapted to be secured to top and bottom elements, respectively, of a punch press;

wherein the cutting elements are adapted to be secured to top and bottom turrets, respectively, of a punch press;

wherein the top and bottom turrets of the punch press are the top and bottom turrets of a numerically-controlled turret punch press;

wherein the lower cutting element comprises a base member adapted to be removably inserted in a complementary receiver in a non-reciprocatable portion of the punch press and wherein the base member and the receiver are shaped so that the base member can be inserted into the receiver and held therein in a predetermined orientation;

wherein the base member of the lower cutting element and the receiver therefore are circular in transverse section and so proportioned that the base member fits snugly into the receiver and the base member and the receiver have complementary keyway means adapted to prevent rotation of the base member in the receiver in one or the other of a plurality of orientations;

wherein said upper cutting element is mounted for vertical reciprocation in a complementarily-shaped housing having guide means for maintaining a desired orientation of said upper cutting element during reciprocation;

wherein the upper cutting element and the housing are circular in transverse section and the guide means comprises vertical pin and slot means operative to hold the cutting element in one or the other of a plurality of orientations;

wherein the cutting elements comprise base members adapted to be removably inserted in complementary receivers in the punch press and the base members and the receivers are shaped so that the base members can be inserted in the receivers and held therein in predetermined orientation;

wherein the base members are circular in transverse section;

wherein the lower cutting element comprises a base member having a circular transverse section and the vertical wall of the element has its top edge oriented on a diameter of the base member;

wherein the upper cutting element comprises a base member having a circular transverse section and the vertical side of the element has its cutting lower edge oriented in an axial plane through a diameter of the base member and the opposite side of the element oriented in a chordal plane parallel to the axial plane;

wherein the lower cutting element comprises a circular base member, wherein the vertical wall of the element is oriented in an axial plane through a diameter of the base member, and wherein the base member has a relief slot one side of which extends vertically up to the top edge of the lower planar surface to one side of the vertical wall and is oriented in a chordal plane parallel to the axial plane and the other side of the slot extends upwardly parallel to the one side and over to the terminus of the vertical wall.

The invention also relates to a lower cutting element of a shear and die set adapted for use in a punch press comprising:

a base member having two horizontally-disposed planar surfaces offset vertically one to the other with a transverse vertical wall disposed in a vertical plane and depending from the upper planar surface toward the lower one and a relief slot coincident in length with the vertical wall and having sides parallel to the vertical plane of the vertical wall one of which sides extends up to the lower planar surface to one side of the vertical wall sufficient to leave a space between it and the vertical wall and the other parallel side of the slot extends up to a point below the plane of the lower planar surface and then over to the vertical wall, the slot thus being wide enough to provide a space between it and the vertical wall and at the same time to undercut the vertical wall, the base member having intact portions at each end of the slot, and wherein, if desired, the base member has a circular transverse section and the periphery thereof has axially-disposed keyway means adapted to orient the die when it is placed in a complementarily-shaped receiver in a press.

The invention also relates to an upper cutting element of a punch and die set, adapted for use in a punch press, comprising:

a base member having a circular transverse section and an essentially planar horizontal lower surface;

a cutting blade depending from said lower surface having a vertical side oriented in an axial plane of said base member, an opposite side oriented in a chordal plane parallel to said axial plane, and near and remote end walls adjacent opposite portions, respectively, of the periphery of said base member;

said cutting blade having a lower cutting edge which extends linearly at an upward angle from the near end wall to the remote end wall and an essentially planar bottom face which angles upwardly from said lower cutting edge to said opposite side.

Also the invention relates to a method for separating, in a punch press, adjacent sections of a workpiece along a predetermined parting line, which method comprises:

providing a shear and die set in which a lower shearing or cutting edge of a vertical side of the shear portion of said set is reciprocated vertically in shearing proximity to an upper cutting or shearing edge of a vertical wall of the die portion of said set, so that only a partial shear is effected for any reciprocation, and advancing the workpiece during the reciprocation so that a stepwise cut is effected along the entire length of said predetermined parting line and so that separation of the workpiece along said predetermined parting line is obtained.

The invention also comprises a method as described above comprising the following steps:

(1) providing an upper cutting element comprising an elongated cutting blade which is essentially vertical on one side and which has a cutting lower edge at the bottom of said essentially vertical side, said cutting blade being angled upwardly from said cutting lower edge of said essentially vertical side to a shorter opposite side of said cutting element and upwardly from one end to the other, said cutting element at its cutting edge defining the portion of said punch press which is operative to separate said workpiece into sections on predetermined parting lines, and said upper cutting element being capable of upward and downward reciprocation;

(2) providing a lower cutting element having two essentially horizontal planar surfaces, one slightly elevated with respect to the other, and a vertical wall depending from the inner edge of said upper planar surface toward said lower planar surface, said vertical wall being adapted to be aligned with said cutting lower edge of said upper cutting element so that the cutting lower edge of said upper cutting element, upon closing said upper cutting element upon said lower cutting element, aligns in slidable vertical relation with said vertical wall in cutting proximity thereto;

(3) positioning a workpiece between said cutting elements with a predetermined parting line in said axial plane;

(4) activating said press from open position to closed position to cause said cutting lower edge to cut partway into said workpiece along said predetermined parting line;

(5) returning said press to open position;

(6) advancing said workpiece to bring an uncut portion of said predetermined parting line into registry with said cutting lower edge; and (7) repeating steps 4, 5, and 6 as necessary to effect separation of said section of said workpiece along the predetermined parting line.

BRIEF DESCRIPTION OF THE DRAWINGS

FIG. 5 is a partial exploded view in side elevation showing the upper cutting element, the stripper, and the lower cutting element;

FIG. 6 is a view taken on line 6—6 of FIG. 5;

FIG. 7 is a view taken on line 7—7 of FIG. 5;

FIG. 8 is a view taken on line 8—8 of FIG. 5;

FIG. 9 is a view similar to FIG. 5 but at 90 degrees therefrom and in cutting position; and FIG. 10 is an enlarged section on line 10—10 of FIG. 9.

DETAILED DESCRIPTION OF PREFERRED EMBODIMENTS

Figure 1:
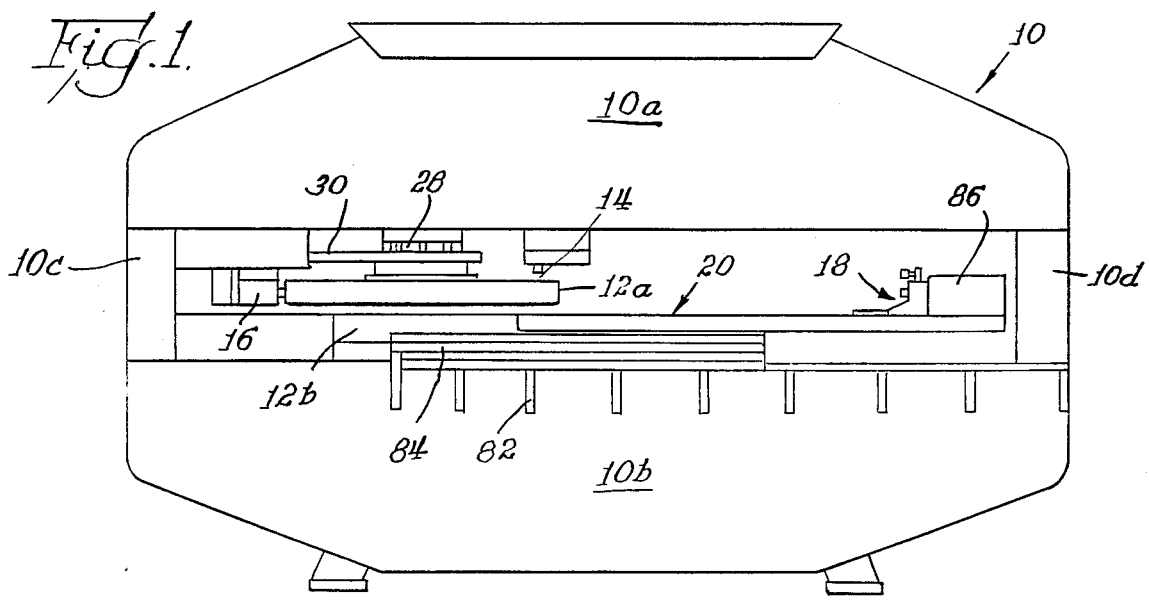
FIG. 1 is a side elevation of a numerically-controlled turret punch press of the invention.
Figure 2:
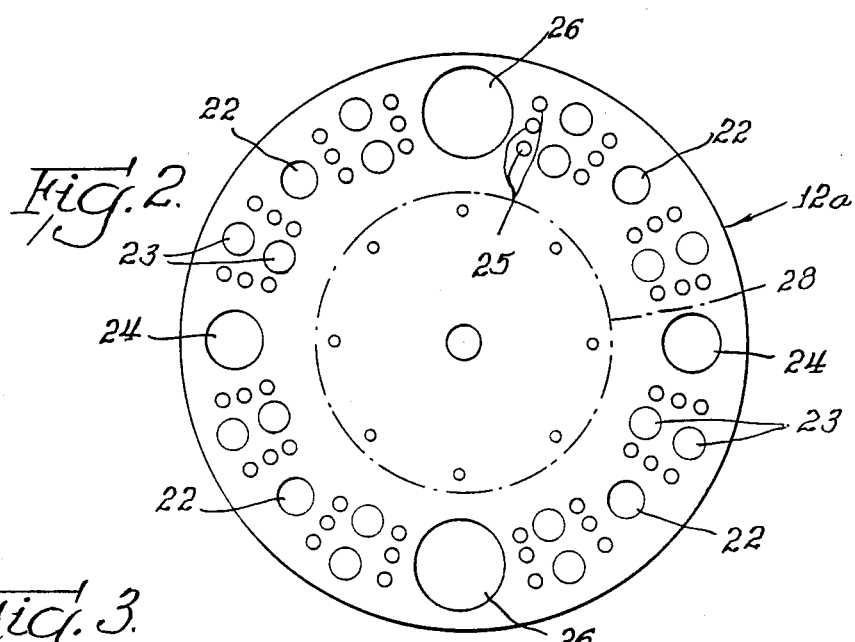
FIG. 2 is a plan view of a turret to be mounted in the press of FIG. 1.

In FIG. 1 there is shown, in side elevation, a numerically-controlled punch press 10 having an upper frame member 10a and a lower frame member 10b connected in a rigid frame structure by side members 10c and 10d. Within this frame structure are two complementary turrets 12a and 12b mounted for rotation on a common vertical axis with the bottom face to turret 12a apposed to and closely spaced from the top face of turret 12b. Turret 12a is provided with a punch drive 14 adapted to strike and actuate a tool supported by the upper turret as will be more particularly described hereinafter.

At 16 there is a turret lock adapted to hold the turret in any position to which it may have been indexed by the numeric controller, which is not shown because it is common in this art and is not an essential part of the invention. However, the structures to be described and claimed find their highest usefulness in connection with a numerically-controlled punch press. The term "punch press" is used herein to refer to a definite type of prior art press even though the press in the invention is not used for punching but for shearing.

Figure 3:
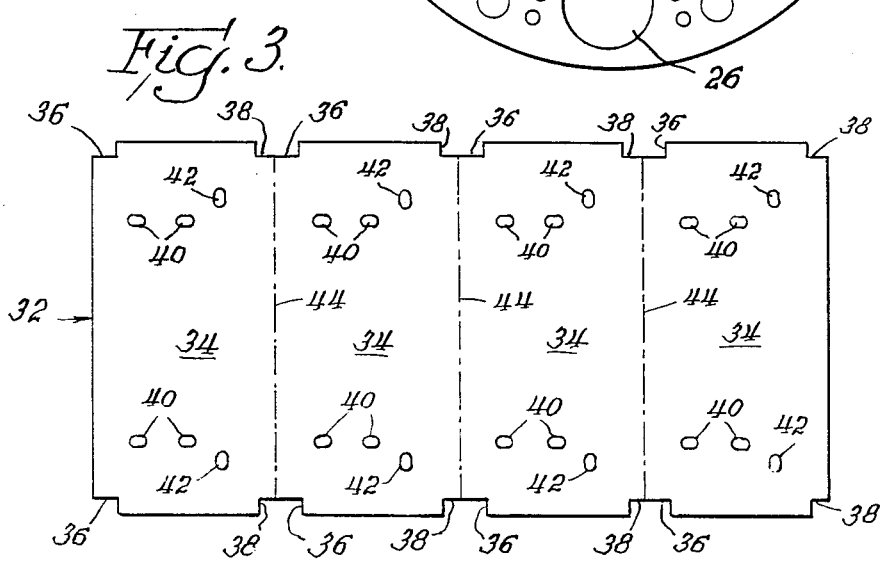
FIG. 3 is a plan view of a workpiece precut and punched and ready to be cut in the shear press of FIG. 1.

A workpiece holder 18 is adapted to move a workpiece, illustrated at 32 in FIG. 3, on table 20 so that the workpiece can be moved to different positions between the turrets 12a and 12b.

The turrets 12a and 12b are provided with tool holders 22, 24, and 26 adapted to hold tool elements according to the invention. These tool holders advantageously are cylindrical bores conforming in size to the particular tool to be used. Other tool holders may be provided as shown at 23 and 25 for effecting other types of operations such as punching. The turret 12b is a mirror image of turret 12a and is also provided with a turret lock (not shown). Thus, when tool holder 26 is indexed to operating position and locked there, the corresponding tool holder in 12b will be indexed to the same position to bring a set of tools into operative position so that the desired operation can be performed on the workpiece.

The upper turret 12a is provided with a sprocket 28 for a chain 30 driven by a drive mechanism (not shown). The lower turret 12b is driven in a like manner so that the tool holders of the one turret either are in or can be brought into registry with the complementary tool holders of the other.

In FIG. 3, there is illustrated a workpiece 32 prepared to be operated upon according to the invention. It is separated into panels 34 and provided with punchouts at 36, 38, and 40 by operating the press as a punch press, i.e., with punching tools in the tool holders. Phantom lines 44 illustrate how the workpiece is to be divided into four panels by effecting a shearing operation on phantom line 44. In practice, there are no actual lines separating the panels (although there could be if desired) because the transverse indexing of the workpiece by the workpiece holder 18 determines the line on which the panel is to be cut.

In an ordinary shearing operation where a sheet of metal, or the like, is cut by a complementary shear and die set, a clean cut is rarely obtained because the pressure exerted on the metal, to effect the shear, causes the last increment or increments of the cut to break off, thus leaving a rough or sharp edge. The shear and die construction and operation now to be described avoid this disadvantage of the prior art because the cut is effected more by a slicing operation than by a shearing operation.

Figure 4:
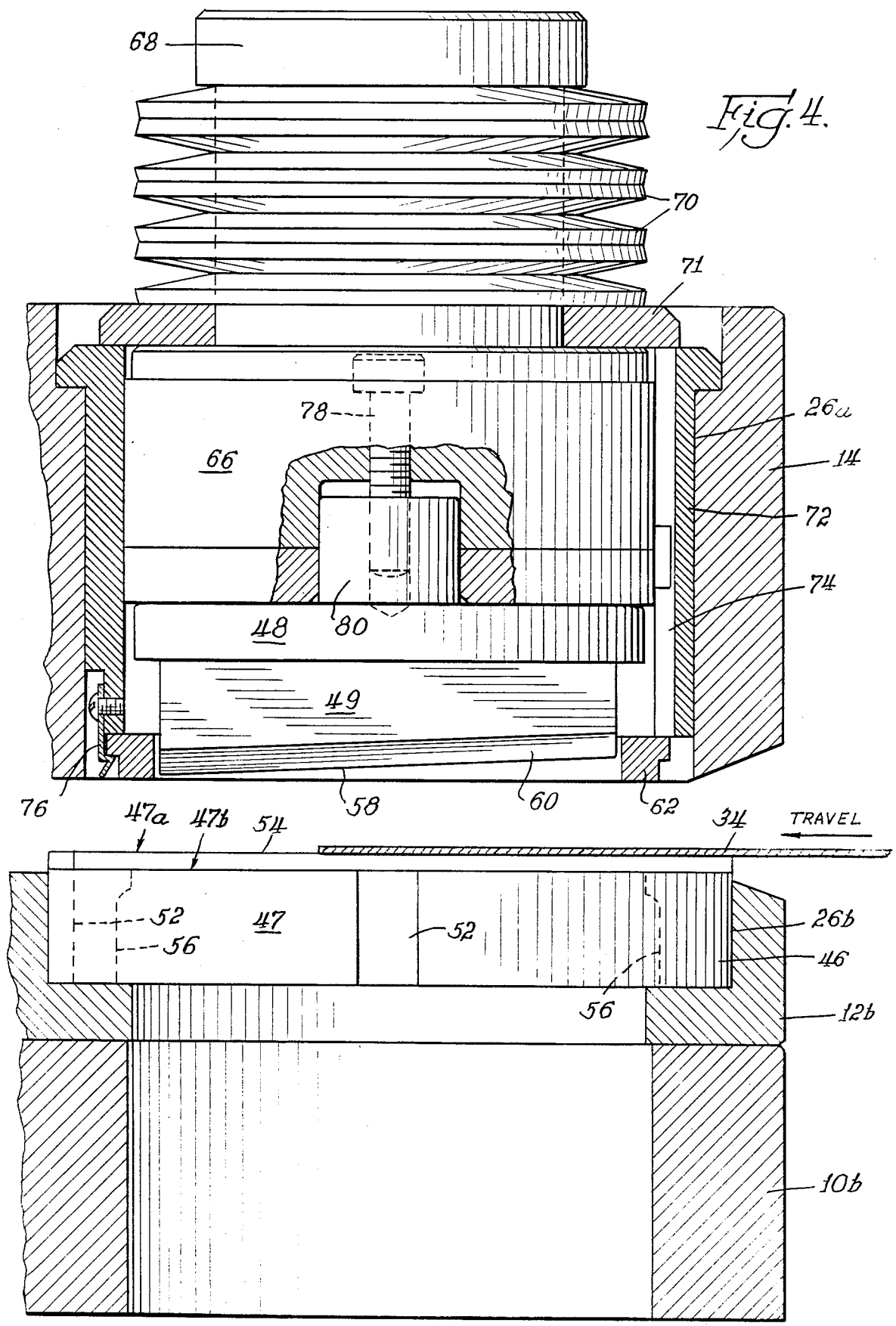
FIG. 4 is a view of a button press comprising an upper cutting element mounted in the upper turret of the shear press of FIG. 1.

In FIG. 4 is shown a shear and die set adapted to operate according to the invention. It comprises a lower cutting member 46 and a upper cutting member 48, details of which are seen in the remaining figures.

The lower cutting member 46 is comprised in a cylindrical block or base member 47 adapted to be received into tool-holder 25b in turret 12b. The base member 47 and the tool-holder 26b are provided with complementary pins and slots 52 to orient the base member 47 in the tool-holder 26b. There can be one pin and one slot, or vice versa, or two pins and one slot, or two slots and one pin, so that the base member 47 can be oriented with the lower cutting edge in different positions. The base member 47 has an upper planar horizontal surface 47a offset relative to a lower planar horizontal surface 47b and a vertical slot 56, one side 56a of which extends up to the lower planar surface 47b and is spaced from a vertical wall 54 which forms the shearing or cutting edge of the die. The other side 56b of the slot 56 extends up vertically and then over to the terminus of the vertical wall 54 at a point below the plane of the lower planar surface 47b.

The upper cutting member comprises a cylindrical base member 48 having a transverse cutting blade 49 depending therefrom with a vertical side 57 in a vertical plane through a diameter of the base member 48 and adapted to be mounted in alignment with the cutting edge 54 of the lower cutting member 46. The lower edge 58 of the blade 49 forms the cutting or shearing edge of the transverse cutting blade 49 which cooperates with the cutting edge 54 of the lower cutting member 46 to effect the desired cutting of the workpiece.

The lower face 60 of the cutting blade 49 slopes or angles up from the vertical side 57 to the opposite side 57a and the cutting edge 58 slopes or angles up from the leading or cutting end 58a, i.e., the end which first contacts the work piece and does the cutting, and the trailing or non-cutting end 58b, as best seen in FIGS. 4 and 9. The end-to-end slope of the cutting edge 58 can be approximately 5 degrees and can range from about 1 to about 10 degrees. The vertical distance the trailing edge 58b is above the leading edge 58a is to be referred to hereinafter as the "drop".

FIGS. 9 and 10 illustrate how the leading end of the cutting edge has cut through the workpiece but the trailing edge has not. In effect the throw of the upper cutting member has been less than one drop. Had it been more than one drop, the entire cutting edge 58 would have cut through the workpiece. This is an important aspect of the invention. Thus, by reciprocating (as represented by the double vertical arrow in FIG. 9) the upper cutting member with a throw less than one drop, no complete shear is ever effected. If at the same time the workpiece is moved longitudinally as indicated by the horizontal arrow, a series of chop-chop operations is effected on the workpiece and it is cut on the phantom parting line 44 in a slicing fashion rather than in the manner of a full shear which, for the reasons already pointed out, results in a ragged or sharp edge.

Base member 48 is combined with cylindrical block 66 and keyed by key 64 into a unitary cylindrical block. The combination is made by means of a centering stud 80 and a bolt 78. The block 66 is received in a housing 72 in tool holder 26a and a pin and slot connection between the two parts, like the pin and slot connection 52, provides the proper orientation of the cutting edge 58 relative to the cutting edge 54. A striking head 68 to be struck by striker 14 is combined with block 66 to provide a unitary assembly. A series of spring washers 70 together with a washer 71 keep the cutting edge in retracted position. In operation the hammer 14 strikes the striking head 68 as required to effect the desired reciprocation of the upper cutting element. For this purpose the throw of the cutting blade 49 is adjusted to be less than one drop. The block 66 is keyed in keyway 74 for vertical reciprocation.

A stripper plate 62, as best seen in FIGS. 4, 5, 6, and 9, is removably affixed to the bottom of housing 72 by fasteners 76 suitably spaced about the periphery of the housing 72.

The table 20 is of usual construction having a bifurcated front end so that it can fit up close to the lower turret 12b and side portions movable along the sides of the lower turret 12b. These side portions are supported by brackets 82 and Thompson bars 84 in a manner already well known in the art. Mechanism also already well known in the art is provided at 86 to effect transverse and longitudinal movement of the workpiece on the table in response to the numeric control mechanism well known in this art.

There is thus provided a shear and die set particularly adapted for use in a standard punch and die press which has numerically-controlled turrets and complementary mechanisms whereby a workpiece can be fed into the press and there cut into panels without punching out material and without producing a ragged or sharp edge at the cut. To this end there is provided a shear and die set in which a lower shearing or cutting edge of a vertical side is reciprocated vertically in shearing proximity to an upper cutting or shearing edge of a vertical wall, in such a manner that only a partial shear is effected for any reciprocation, and advancing the workpiece during the reciprocation so that a cut is effected along the entire length of the portion of the workpiece to be severed.

While the invention has been described with reference to particular embodiments thereof, it is to be understood that it is not to be limited in the details of these embodiments as variations will readily be apparent to those skilled in the art once they have been apprised of the invention and that the invention, accordingly, is not to be limited except by the scope of the appended claims.

I claim:

1. A method for separating, in a punch press, adjacent sections of a workpiece along a predetermined parting line, which method comprises
    (1) providing an upper cutting element comprising an elongated, narrow cutting blade which has essentially vertical, parallel sides, located between two ends of said blade, one of said sides having a cutting lower edge at the bottom thereof aligned in an axial plane of said cutting element, said cutting blade being angled upwardly from said cutting lower edge of one said essentially vertical side to the other side of said cutting blade and upwardly from one end toward the other, said cutting element at its cutting edge defining the portion of said punch press which is operative to separate said workpiece into sections along predetermined parting lines, and said upper cutting element being capable of upward and downward reciprocation;
    (2) providing a lower cutting element having two essentially horizontal planar surfaces, one slightly elevated with respect to the other, and a vertical wall depending from the inner edge of said upper planar surface toward said lower planar surface, said vertical wall being adapted to be aligned with said cutting lower edge of said upper cutting element so that the cutting lower edge of said upper cutting element, upon closing said upper cutting element upon said lower cutting element, aligns in slidable vertical relation with said vertical wall in cutting proximity thereto;
    (3) placing a workpiece between said cutting elements with a predetermined parting line in line with said cutting elements;
    (4) activating said press from an open position to a closed position to cause said cutting lower edge to cut into said workpiece along said predetermined parting line;
    (5) returning said press to open position;
    (6) advancing said workpiece to bring an uncut portion of said predetermined parting line into registry with said cutting lower edge; and
    (7) repeating steps 4, 5, and 6 as necessary to effect separation of said section of said workpiece.

2. A shear and die set adapted to effect parting between adjacent sections of a workpiece comprised of the following elements in combination:
    an upper cutting element comprising a single, elongated and narrow, rectilinear cutting blade having parallel essentially vertical sides located between two ends of said blade, one of said sides having a cutting lower edge at the bottom thereof;
    said cutting blade being angled up transversely from said cutting lower edge to a lower edge of the other of said sides and up longitudinally from one end toward the other end thereof;
    said upper cutting element at its cutting lower edge defining the portion of said shear and die set which is operative to cut off a section of said workpiece and being adapted to be vertically reciprocated in a punch press;
    a complementary, lower cutting element comprising a die member having two essentially planar surfaces lying in essentially horizontal parallel planes, one of which is slightly above the other and has a single rectilinear inner edge, and a vertical wall depending from said rectilinear inner edge toward the plane of the lower planar surface; and
    said lower cutting element being adapted to be secured to said punch press in a position such that said inner edge is and cooperates with said cutting lower edge in a position to effect the desired cut upon closing said upper cutting element upon said lower cutting element.

3. The shear and die set of claim 2, wherein said cutting elements comprise cylindrical base members adapted to be removably inserted in complementary receivers in said punch press and said base members and said receivers are shaped so that the base members are insertable in the receivers to be held therein in a predetermined orientation in which said cutting lower edge is disposed so that it reciprocates in an axial plane in shearing contact with said vertical wall.

4. The shear and die set of claim 2, wherein said lower cutting element comprises a circular base member, wherein said vertical wall is oriented in an axial plane through a diameter of said base member, and wherein said base member has a relief slot one side of which extends vertically up to the top edge of said lower planar surface to one side of said vertical wall and is oriented in a chordal plane parallel to said axial plane, and the other side of said slot extends upwardly parallel to said one side of said relief slot and then over toward said one side to the terminus of said vertical wall.

5. Apparatus for separating, in a punch press, adjacent sections of a workpiece along a predetermined parting line, which comprises:
    (1) an upper cutting element comprising an elongated, narrow cutting blade which has essentially vertical, parallel sides and tow ends, one of said sides having a cutting lower edge at the bottom thereof aligned in an axial plane of said cutting element, said cutting blade being angled upwardly from said cutting lower edge of said essentially vertical side to the other side of said cutting blade and upwardly from one end toward the other, said cutting blade at its cutting edge being operative to cut said workpiece into sections along predetermined parting lines, and said upper cutting element being capable of upward and downward reciprocation;

(2) a lower cutting element having two essentially horizontal planar surfaces, one slightly elevated with respect to the other, and a vertical wall depending from an inner edge of the upper planar surface toward the lower planar surface, said vertical wall being adapted to be aligned with said cutting lower edge of said upper cutting element so that the cutting lower edge of said upper cutting element, upon downward closing of said upper cutting element toward said lower cutting element, aligns in slidable vertical relation with said vertical wall in cutting proximity thereto;

(3) means for supporting a workpiece between said cutting elements with a predetermined parting line in line with said cutting elements;

(4) activating means for activating said press from open position to closed position to cause said cutting lower edge to cut into said workpiece along said predetermined parting lines;

(5) means for returning said press to open position; and (6) advancing means for advancing said workpiece to bring an uncut portion of a predetermined parting line into registry with said cutting lower edge and into position for further cutting on said predetermined parting line.

* * * * *

UNITED STATES PATENT AND TRADEMARK OFFICE
CERTIFICATE OF CORRECTION

PATENT NO. : 4,981,058

DATED : Jan. 1, 1991

INVENTOR(S) : Andrew G. Gavrun

It is certified that error appears in the above-identified patent and that said Letters Patent is hereby corrected as shown below:

Title Page [56] References Cited, U. S. PATENT DOCUMENTS; line 3, "4,250,784 1/1981" should read -- 4,250,784 2/1981 --.

Column 5, line 54; before "upper" change "a" to -- an --.

Column 8, line 32; "is and" should read -- is aligned and --.

Signed and Sealed this

Nineteenth Day of May, 1992

Attest:

DOUGLAS B. COMER

*Attesting Officer*     *Acting Commissioner of Patents and Trademarks*